Patented June 5, 1951

2,555,468

UNITED STATES PATENT OFFICE 2,555,468

FATTY FOOD COMPOSITIONS AND METHOD OF MAKING SAME

Herman H. Bogin and Rufus D. Feick, Detroit, Mich., assignors to Parke, Davis & Company, Detroit, Mich., a corporation of Michigan No Drawing. Application July 16, 1949, Serial No. 105,277

3 Claims. (Cl. 99—123)

This invention relates to improvements in fat food products. More particularly the invention relates to dry, stable non-toxic greaseless food products containing a food which in its ordinary form is of a greasy or fatty constituency.

Fat food products are of a greasy character and are difficult to mix with comminuted food products. Moreover, the fats tend to become rancid due to oxidation when stored under normal conditions.

When fats, such as hydrogenated vegetable oil, poultry fat or lard, are used in dried soup preparations, they are either enclosed in an expensive and slow-dissolving gelatin capsule or are mixed directly with dried vegetables and seasoning. The latter mixtures often result in a greasy and unsightly combination which requires special packaging.

We have discovered a means whereby fat food products which are normally greasy in character may be converted to free-flowing, stable, non-toxic and greaseless powdered food products. Our invention consists in forming an emulsion from an aqueous solution of polyvinyl alcohol and a fat food product which is normally greasy in character, evaporating the water therefrom and comminuting the dry mass thus obtained. The polyvinyl alcohol is in intimate mixture with the fat and serves to protect it against oxidation and consequent rancidity.

These new powdered products are dry, stable, non-toxic and greaseless. They may be handled with facility because of their free-flowing properties. They may be mixed easily with other comminuted food products and when heated with water readily release the oily fat.

Dried soups are easily mixed with the fats prepared in powder form as described herein. The mixture requires no special packaging and when heated with water imparts the necessary oily fat to the prepared soup.

In preparing the products of this invention, the fat heated to the liquid state is mixed to an emulsion with an aqueous solution of the polyvinyl alcohol, blending machines, colloid machines or homogenizers being used to accomplish thorough emulsification. The resulting mixture is dried. Although various methods of drying can be used, the preferred process is carried out in vacuum and at a low enough temperature to prevent decomposition. The solid residue is pulverized to the desired mesh. If a small amount of oil is released during the grinding process, it is readily removed by washing with petroleum ether or benzene or similar solvent.

The amounts of polyvinyl alcohol to be used with a particular fat ranges from 20 to 60% by weight. Increasing the amount of polyvinyl alcohol decreases the amount of oil released during the grinding process.

The following are illustrative examples.

Example 1

12.2 parts by weight of polyvinyl alcohol are dissolved in 238.5 parts of hot water. The solution held at 60° C. in a blending machine is treated with a slow stream of 50 parts of melted hydrogenated vegetable fat maintained at 50° C., vigorous agitation being effected during the addition. The resulting emulsion is vacuum dried at 65° C. and 4 mm. pressure. The solid thus obtained is ground to a 16 mesh powder and any fat released during the grinding is removed by washing the powder with petroleum ether. The product obtained after evaporation of the wash solvent is a dry, stable, non-toxic, greaseless powder.

Example 2

In a similar way, 33.3 parts of polyvinyl alcohol are combined with 50 parts of hydrogenated vegetable shortening. In this case very little oil is released from the solid mixture during the grinding process. The product has properties similar to those of the product prepared in accordance with Example 1.

Example 3

30 parts of polyvinyl alcohol and 30 parts of hydrogenated vegetable shortening are combined as in Example 1 and yield an excellent dry powder containing approximately equal parts by weight of the shortening and polyvinyl alcohol. The product is free-flowing, non-toxic, greaseless and stable.

Example 4

In a similar way, 9 parts of polyvinyl alcohol and 200 parts of water are emulsified with 21 parts of chicken fat. The emulsion is dried under high vacuo at 40° C. This results in a better dry emulsion than a similarly constituted hydrogenated vegetable oil emulsion. The powder obtained on grinding is greaseless, non-toxic and stable. It may be added to dehydrated vegetables to obtain a greaseless prepared soup product.

Example 5

15 parts of polyvinyl alcohol are combined with 15 parts of chicken fat as above, resulting in an excellent dry powder.

Example 6

9 parts (30%) of polyvinyl alcohol in 225 parts of water are emulsified with 21 parts (70%) of lard at 60° C. The emulsion is dried in vacuum at 65° C. and the lard released on grinding is removed by washing with petroleum ether. The powder thus obtained is stable, greaseless and free-flowing.

Example 7

30 parts of polyvinyl alcohol and 30 parts of lard are emulsified in water as in the above example to obtain a good dry powder.

Example 8

4 parts of polyvinyl alcohol in 150 parts of water are emulsified with 6 parts of fats as contained in the large soft gelatin capsule supplied in a commercial package of noodle soup. When the emulsion is dried and ground there is obtained an attractive dry powder which instantly releases its oil in hot water.

Example 9

As in the above example, 5.6 parts (20%) of polyvinyl alcohol are combined with 22.2 parts (80%) of fats and dehydrated vegetables as contained in another commercial noodle soup package. A high speed mixer is used to accomplish thorough emulsification. The pulverized dried emulsion is a stable, free-flowing greaseless powder.

Example 10

As in the preceding example, 2.45 parts (20%) of polyvinyl alcohol are combined with 9.80 parts (80%) of fats (contained as a greasy gob) supplied in a commercial vegetable noodle soup. A greaseless free-flowing powder is obtained upon grinding the dried mass.

What we claim as our invention is:

1. A dry, stable, non-toxic, greaseless solid fat food product comprising an intimate mixture of a normally greasy fat food product and polyvinyl alcohol.

2. A solid fat food product comprising a fat which is normally greasy and 10 to 50% by weight of polyvinyl alcohol.

3. The method of stabilizing a normally greasy fat food material which comprises forming an aqueous emulsion of said material and polyvinyl alcohol, evaporating the water therefrom and comminuting the dry mass.

HERMAN H. BOGIN.
RUFUS D. FEICK.

REFERENCES CITED

The following references are of record in the file of this patent:

UNITED STATES PATENTS

| Number | Name | Date |
|---|---|---|
| 1,928,781 | Chapin | Oct. 3, 1933 |

OTHER REFERENCES

"The Condensed Chemical Dictionary" by Gregory, third edition, Reinhold Publishing Corporation, 330 W. Forty-Second St., New York, page 517.